United States Patent
Steinich

(10) Patent No.: US 11,656,107 B2
(45) Date of Patent: May 23, 2023

(54) ENCAPSULATED POSITION SENSOR FUNCTIONAL UNIT

(71) Applicant: ASM Automation Sensorik Messtechnik GmbH, Moosinning (DE)

(72) Inventor: Klaus Manfred Steinich, Zorneding / Pöring (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 0 days.

(21) Appl. No.: 17/686,082

(22) Filed: Mar. 3, 2022

(65) Prior Publication Data
US 2022/0364889 A1    Nov. 17, 2022

(30) Foreign Application Priority Data
May 17, 2021   (DE) .......................... 102021112706.8

(51) Int. Cl.
*G01D 11/30* (2006.01)
*G01D 11/24* (2006.01)

(52) U.S. Cl.
CPC ........... *G01D 11/245* (2013.01); *G01D 11/30* (2013.01)

(58) Field of Classification Search
CPC .............................. G01D 11/30; G01D 11/245
See application file for complete search history.

(56) References Cited

U.S. PATENT DOCUMENTS

| | | |
|---|---|---|
| 5,590,091 A | 12/1996 | Gloden et al. |
| 5,736,855 A | 4/1998 | Smith et al. |
| 2001/0017539 A1* | 8/2001 | Brunsch .................. G01P 3/486 324/207.13 |
| 2004/0196117 A1* | 10/2004 | Kiessling ............ F15B 15/2892 29/840 |

FOREIGN PATENT DOCUMENTS

| | | |
|---|---|---|
| DE | 69637308 | 2/2008 |
| DE | 102011003368 | 8/2012 |
| DE | 2014005637 | 10/2015 |
| DE | 102005060676 | 1/2021 |

* cited by examiner

*Primary Examiner* — Jamel E Williams
(74) *Attorney, Agent, or Firm* — Head, Johnson, Kachigian & Wilkinson, PC

(57) ABSTRACT

Since the functional unit (PS-F) of a position sensor is no longer to be repaired in the event of failure, but is to be replaced completely—which is nevertheless to be canred out according to the principle of bloodless removal, especially when arranged in a piston of a working cylinder unit—according to the invention, such functional units are manufactured in different dimensions and possibly also functioning according to different measuring principles in a very simple and cost-effective manner and according to the modular principle in that a functional rod (FS) of the functional unit (PS-F) on the one hand the electronics board (2) with the evaluation unit (12) on the other hand are each inserted opposite the pot-shaped head housing (1), from which the functional rod (FS) then protrudes from the open side (1a), and are pre-fixed to the latter, and the head housing (1) is then cast from the open side, which only brings about the firm connection between the evaluation electronics (12) on the one hand and the functional rod (FS) on the other after curing. This results in a fully functional unit (PS-F), which can also be tested and programmed, but which is nevertheless housed by the customer-depending on the application in a further protective housing (100), usually made of metal.

18 Claims, 14 Drawing Sheets

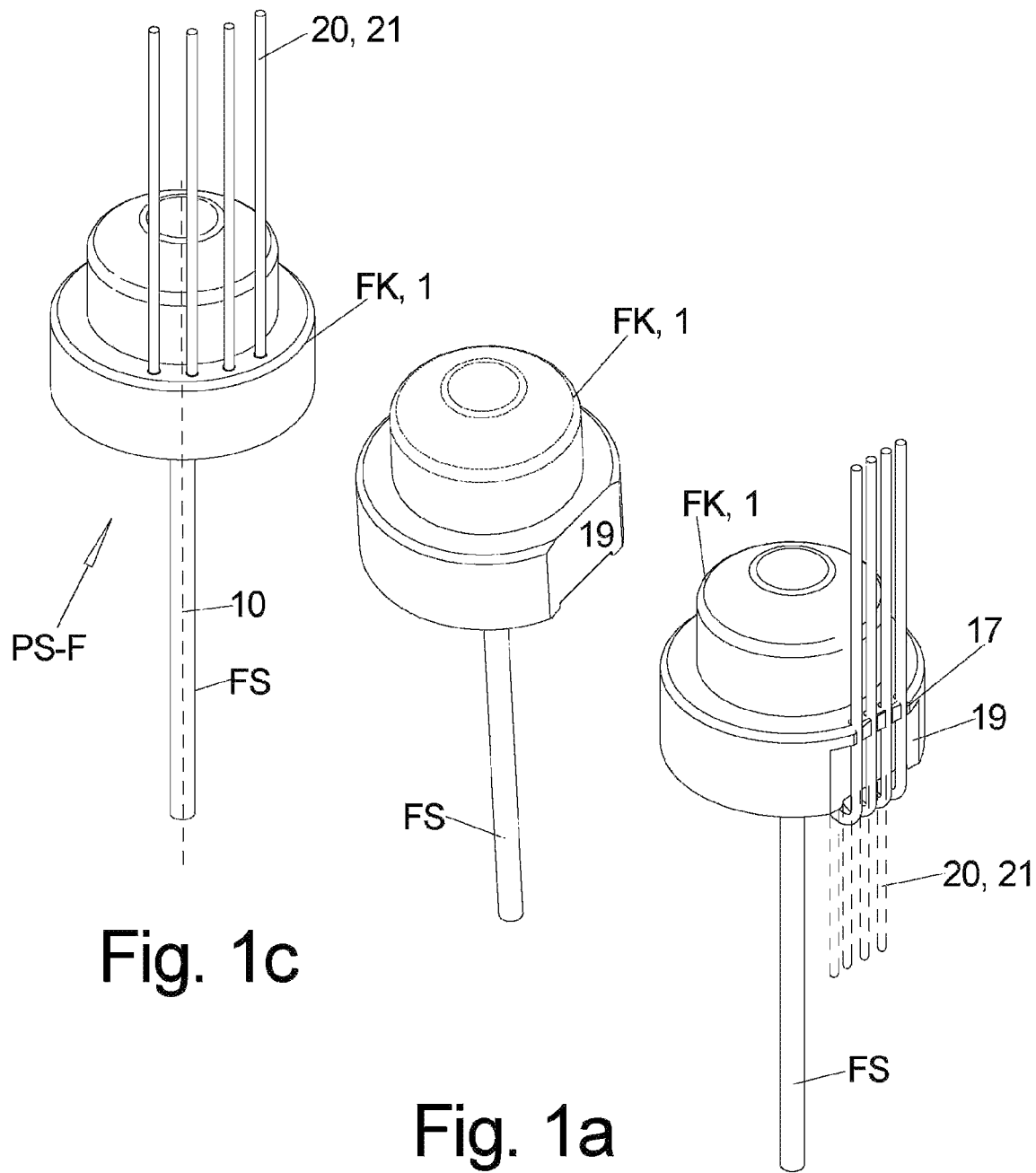

Figure 1D:
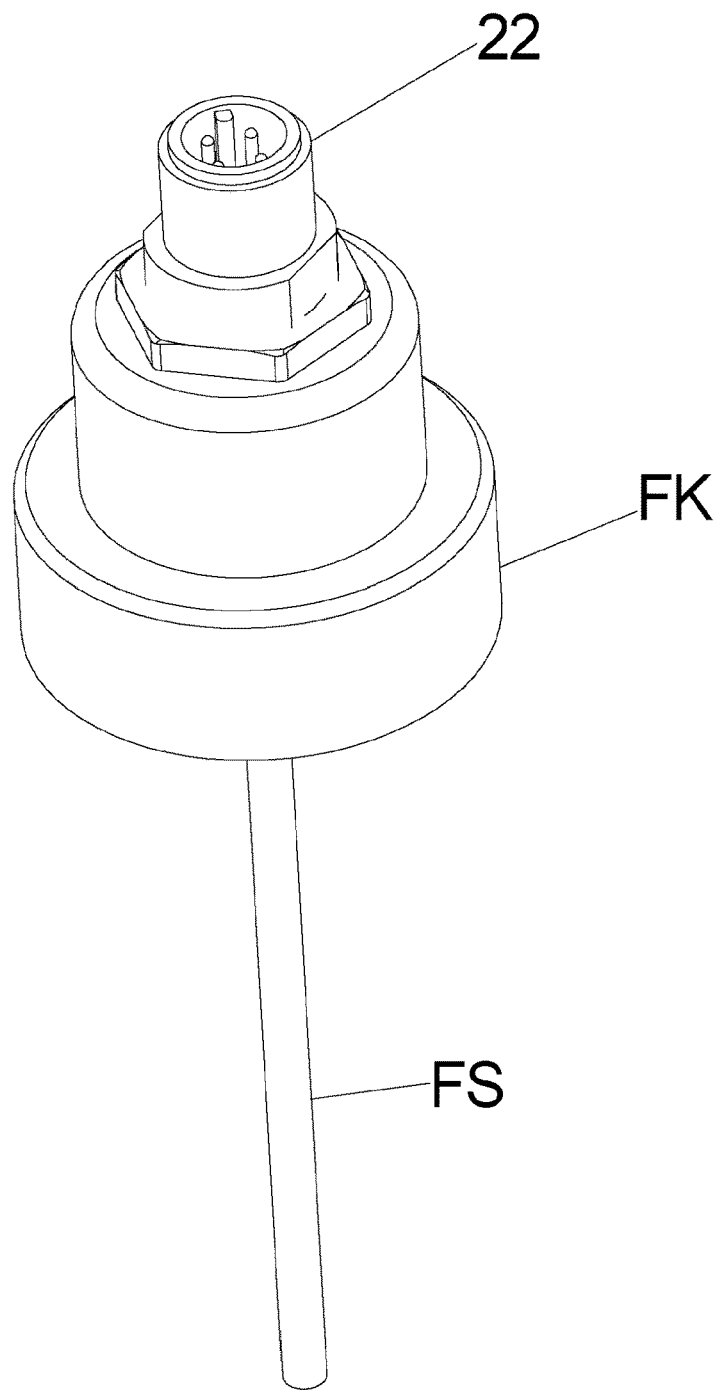

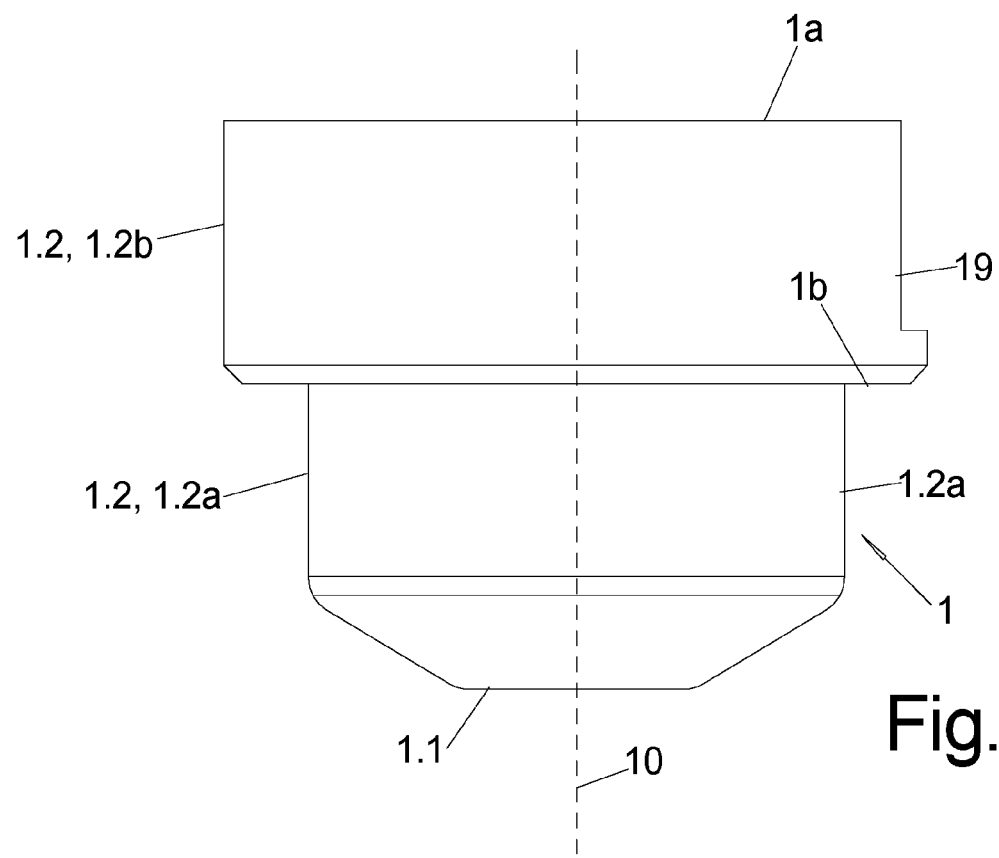
Fig. 2a1
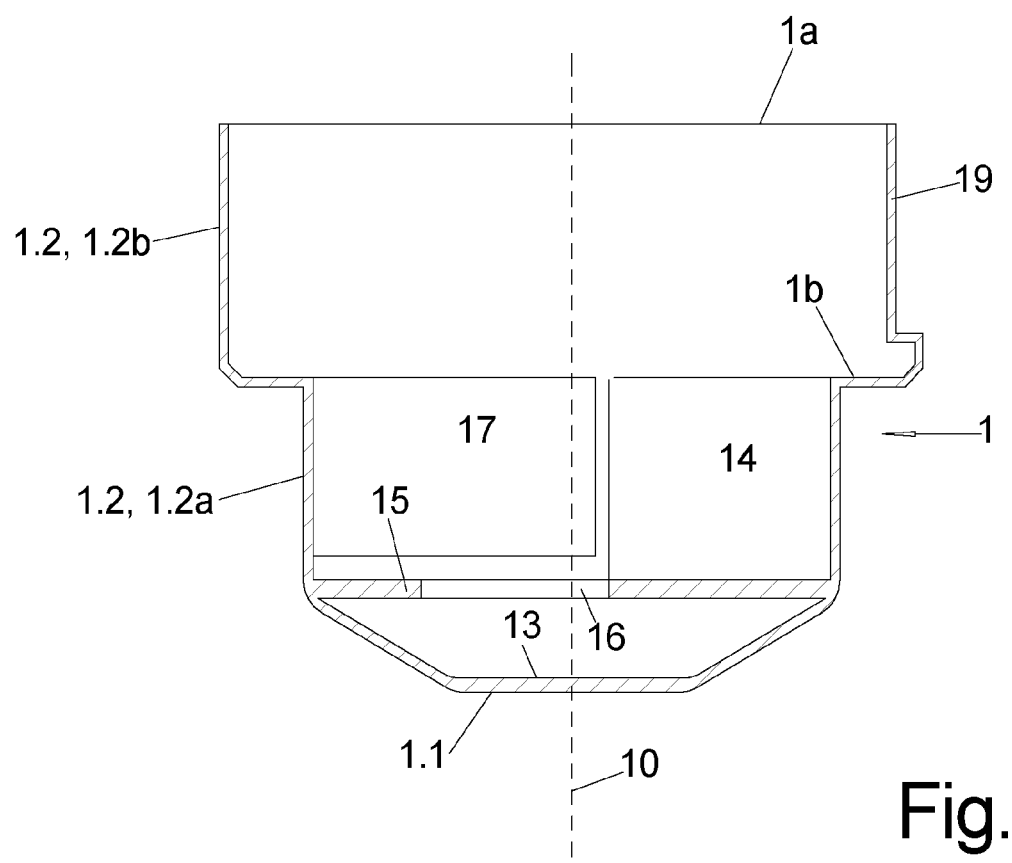
Fig. 2a2

ENCAPSULATED POSITION SENSOR FUNCTIONAL UNIT

FIELD OF APPLICATION

The invention relates to position sensors based on a non-contact function principle in rod-type design for use, inter alia, in liquids. Rod-type position sensors measure the position of a position encoder, which is attached to a movable part relative to the rod-type position sensor, without contact.

TECHNICAL BACKGROUND

Such sensors are mounted, among other things, inside hydraulic or pneumatic cylinders in order to know at any time the exact extension length of the piston/cylinder unit, which is of crucial importance for the control of the machines and devices operated with them.

The position sensor functional unit, which contains all the functional components of the position sensor except for the encoder, usually consists of a functional head arranged in a head housing and a longer and slimmer functional rod connected to it.

The position sensor functional unit is usually housed in a sealed protective housing, which usually consists of a long slim rod protective housing and a closely adjoining shorter head protective housing, which has a larger diameter, and in which the evaluation electronics are housed.

However, the shape, function and embodiment of the protective housing depend on the particular application, which is why the protective housing is often designed or even manufactured or procured by the user, or different variants of it are offered by the manufacturer of the position sensor functional unit.

From a production point of view, it is of course advantageous if the position sensor functional unit is always the same and can therefore be manufactured in larger quantities, thus enabling the production processes to be better automated.

The sensor with its head protective housing is usually arranged longitudinally fixed in the cylinder of the piston/cylinder unit in such a way that the slim sensor rod housing extends into a usually central bore of the piston or piston rod, to which the position sensor is attached.

Since the rod protective housing and thus the measuring length of the sensor extend over the entire possible extension length of the piston rod, the current relative position of the piston rod to the cylinder is known at all times.

The following non-contact sensor principles are used
differential-transformer measuring methods (LVDT's),
non-contact inductive measuring methods (LVP's),
inductive-potentiometric measuring methods,
   capacitive measuring methods
   Hall measurement methods,
radar measurement methods (time of flight or guided wave),
time domain reflection methods
Eddy current methods,
resonance methods,
PLCD sensors, in which a virtual, variable air gap is generated by a magnet in a ferromagnetic core.

Magnetic, in particular magnetostrictive or magnetic-inductive, operating principles are also frequently used. Here, a permanent magnet is used as the position encoder; in the other methods, a tubular sleeve, a plunger or a similar component is used.

As is well known, magnetostrictive position sensors work as follows:

A waveguide typically consists of a tube, a wire, or a strap, and may also serve as an electrical conductor. The waveguide may further be arranged in a shaping, linear or circular, body of non-magnetic material, e.g., plastic or metal to receive and support the waveguide.

Based on the Wiedemann effect, a current pulse fed into the waveguide generates a mechanically elastic wave when superimposed on a position magnet.

At one point, usually at one end of the waveguide, the torsional part of this mechanical-elastic pulse in particular is detected by a detector unit, which is usually in a fixed position with respect to the waveguide. The time period between the triggering of the current impulse and the reception of this mechanical-elastic wave is thereby a measure of the distance of the displaceable position element, e.g. the position magnet, from the detector unit.

A typical sensor of this type is described in U.S. Pat. Nos. 5,590,091 and 5,736,855.

In the following, only magnetostrictive position sensors will be referred to by way of example, without limiting the invention to this position measuring principle.

DESCRIPTION OF THE INVENTION

A) Technical Object

It is therefore the object of the invention to provide a position sensor functional unit which can be sold as an already adequately protected unit and which needs only to be inserted into a protective housing at the customer's premises and which can be manufactured simply and inexpensively for different measuring lengths and according to different measuring principles.

B) Achievement of the Object

This object is solved by the features of claims 1, 15 and 17. Advantageous embodiments result from the subclaims.

With regard to the position sensor functional unit (PS-F), this object is solved by the fact that it is a functional component part encapsulated, in particular tightly encapsulated, against the ingress of liquids, which is also already relatively well protected against mechanical damage and can be shipped to customers and assembled by them as an easily handable individual part, for example in a surrounding protective metal housing.

Another advantage is that the position sensor functional unit is already fully functioning and, in particular, can also be electrically connected and tested before being shipped to the customer and arranged, in particular, in a protective housing.

Furthermore, position sensor functional units operating according to different measuring principles can be manufactured as long as they require only the same basic structure, namely
  on the one hand, a functional rod which extends along the measuring direction and along which, for example, a contactlessly coupled encoder element, for example an encoder magnet, can be displaced, the position of which is to be measured along the functional rod, as well as
  a functional head in which the evaluation electronics are arranged, usually on an electronics board.

The evaluation electronics are housed in a pot-shaped head housing, in which the head end of the functional rod also ends, which usually extends through a central passage of the electronics board when the evaluation electronics are housed on an electronics board.

The functional rod also has a detector element at its head end and, depending on the operating principle of the sensor, also a signal output element with which a triggering signal is input into the functional rod.

A typical application is a magnetostrictive position sensor, in which a waveguide extends along the sensor rod, into which an electrical start pulse is input at the head end and the returning mechanical-elastic density wave is measured by a detector element, which is also arranged at this head end, with respect to the time offset relative to the emission of the electrical start pulse.

Furthermore, a signal-technical connection between the evaluation electronics and the detector element and—if present—the signal output element is present, usually via internal contacting connections such as internal wires or litz wires or a flexible strip conductor, i.e. a thin, flexible electronics board, which usually has only conductor lines.

According to the invention, the evaluation electronics and at least the detector element of the functional rod, preferably also—if present—the signal-related internal line connection between them, and if necessary also to the signal output element, are tightly encapsulated in the head housing by means of a hardening potting compound which fills the interior of the head housing to such an extent that the components mentioned are enclosed by the potting compound, preferably completely enclosed.

In this case, the open side of the pot-shaped head housing faces the functional rod projecting from the head housing and the potting compound, also its free end remote from the head housing.

A second aspect of the solution according to the invention is that the functional rod as well as the evaluation electronics, in particular the electronics board, are not mechanically fixed directly to each other, but are only indirectly fixed to each other via the head housing and/or the hardened potting compound.

The head housing serves, so to speak, only for pre-fixing the functional rod on the one hand and the electronics board on the other hand relative to the head housing, until casting with the potting compound and its hardening.

Accordingly, in the case of a passage through the electronics board, there is a distance, i.e. clearance, between them for the functional rod to be inserted through, so that the functional rod is not guided through the inner circumference of the passage.

Instead, the functional rod is inserted into the head housing from the open side until, on the one hand, it is in contact with an axial stop of the head housing and, on the other hand, it is adequately guided by guide elements resting laterally against it, which are components, in particular integral components, of the head housing, and is thus clearly positioned in its relative position to the head housing during casting.

These guide elements can be embodied as centering guide elements so that they center the functional rod in a position centered between them. In particular, these guide elements are elastic in the radial direction with their contact surface relative to the functional rod, so that they can also receive functional rods with limitedly different outer circumferences and outer diameters between them.

Furthermore, an intermediate bottom can be provided between the guide elements and the bottom of the head housing, in which a passage for the functional rod can be located or which serves as an axial stop for the functional rod and/or as a further guide element for the functional rod.

Such a functional rod can in particular have a larger outer diameter at its head end than in its remaining course, in particular in the direction of the head end with one or more steps, since more interior space is required there to accommodate the detector element and/or the signal output element.

As a rule, stranded wires protrude from the functional rod at the head end for the internal signal connection to the evaluation electronics, and if these are arranged on an electronics board, these Litz wires are electrically conductively connected to the electronics board, in particular by soldering.

If there is a passage in the intermediate bottom for the functional rod, and this serves in particular as a further guide element in the radial direction, the passage has an extension in the transverse direction, which serves for the passage of the internal insulated wires which emerge from the functional rod—then near the bottom and between the bottom and the intermediate bottom—upwards over the intermediate bottom and in the direction of the evaluation unit.

An electronics board with the evaluation electronics is precisely positioned in the head housing by the presence of at least one axial stop, in particular a shoulder extending around the inner circumference of the wall of the head housing and/or circumferential stops acting in the axial direction, which prevent the board from rotating about the axial direction—generally the direction in which the functional rod extends—relative to the head housing.

Furthermore, the design of the electronics board on the one hand and the inner circumference of the head housing on the other hand provides passages—either between the inner side of the wall of the head housing and the outer circumferential contour of the electronics board offset therefrom in certain areas or through-holes in the electronics board—so that the liquid or pasty potting compound poured from the open side of the head housing can pass through the plate or flow past it to the bottom of the head housing, in order to completely close the end of the functional rod, in particular together with the detector element and the The head housing is made of a material which can pass through or past the head housing to the bottom of the head housing in order to completely enclose the end of the functional rod, in particular together with the detector element and any signal emitting element, in particular with a so-called "thick coating", for which purpose the air displaced by the potting compound must also be ensured to escape upwards out of the head housing.

As a rule, the head housing is essentially rotationally symmetrical in its inner and/or outer contour, although flattenings of this essentially rotationally symmetrical contour may well be present when viewed in the axial direction.

Preferably, the head housing is an injection-molded part, in particular a plastic injection-molded part or a metal injection-molded part, depending on the desired shielding effect, for example with regard to EMC radiation.

In the case of a plastic injection-molded part, this can be provided with a metallic coating over the entire outer surface and/or inner surface for EMC impermeability.

Since the head-side end of the functional rod is usually guided and held and molded near the bottom of the head housing, the inner free cross section of the head housing is often designed to decrease continuously or in steps from the open side to its bottom, since more free inner cross section is arranged closer to the open side for the arrangement of the electronics board, which is usually arranged to run transversely to the axial direction and thus to run approximately parallel to the open side of the pot-shaped head housing.

However, such an electronics board can also be provided running in the axial direction in the head housing, especially if the head housing is to be as narrow as possible but there is no length limitation in the axial direction.

Such a position sensor functional unit also requires an external data link to a higher-level unit, such as a control system, which is to receive the measurement signals from the position sensor functional unit.

A distinction must be made between contacting, conventional signal technology connection via insulated stranded wires, cables or a flexible conductor track and a contactless signal technology connection—in particular via radio or another frequency of electromagnetic radiation.

In the case of contacting external connection, the litz wires—the flexible strip conductor is not mentioned separately here each time, but should be covered—must be led out of the potted part of the functional unit.

This can be done by leading them out of the potting compound in the direction of and through the open side of the head housing, whereby, depending on the direction, the wires can then be bent over the edge of the pot-shaped housing and led down to its outside and can be fixed, in particular latched, in clamping elements present there.

However, the wires can also be led out through the underside, in particular the bottom, but also through the peripheral wall, in particular a shoulder of the peripheral wall of the pot-shaped head housing—in this case usually sealed by bushings made of soft plastic, such as silicone, inserted into the through openings. Gluing is also possible. Sealing is also possible if the through-holes there are so precisely adapted to the diameter of the individual stranded wires to be inserted that no liquid or paste-like casting compound can pass between them during casting, even without sealed bushings.

The functional unit also requires a power supply, in particular for the evaluation electronics.

The required electrical energy can be supplied through one of the lines, but just as the signal connection can be made without contact, in particular by radio, the energy supply can also be made without contact from the outside, for example by means of electrical induction, in which case an inductive element must be present in the head housing in which an electrical voltage is induced by alternating magnetic fields acting on it from the outside and the electrical energy is transferred, for example, to a control unit connected to the evaluation unit. The electrical energy is stored, for example, in an energy store connected to the evaluation electronics, such as a capacitor or a battery.

With regard to the position sensor as a whole, this object is solved by the fact that—unless the position sensor functional unit is used as described above without further protective measures—it can also comprise, in addition to the position sensor functional unit, a surrounding protective housing which consists, on the one hand, of a pot-shaped head protective housing and, on the other hand, of a rod protective housing, wherein the pot-shaped head protective housing is generally a tube closed on one side, i.e. is likewise slim pot-shaped, and is tightly connected, in particular welded or glued, with its open side to a corresponding passage in the bottom of the head housing having a much larger diameter.

The rod protective housing is used for inserting the functional rod of the functional unit, and the head protective housing connected thereto is used for receiving the head housing of the functional unit, so that this functional unit can thus be inserted into the open side of the protective housing with the free end of the functional rod first, and then—if necessary after leading out the leads of the external connection—the head protective housing only has to be closed, in particular tightly closed.

As a rule, the protective housing serves above all to provide improved protection against mechanical damage, high ambient pressure or aggressive environmental conditions and is therefore preferably made of metal, in particular stainless steel.

According to the invention, the pot-shaped head protective housing and the likewise pot-shaped rod protective housing are arranged with their open sides facing in a first direction, while the pot-shaped head housing of the functional unit faces with its open side in the opposite direction, i.e. in the direction of insertion of the functional unit into the protective housing.

The two directions can also deviate from each other by up to 10°, preferably up to a maximum of 5°, depending on the clearance of the functional rod in the rod protective housing.

Precisely because the head housing of the functional unit itself, i.e. without casting compound, only has to provide a limited protective effect, it can usually be manufactured as an inexpensive plastic part. If variations of it are required in small numbers, this can also be done by 3D printing instead of injection molding.

The invention therefore offers the possibility of producing such a position functional unit in the manner of a construction kit in many different variants on the basis of only a small number of different individual parts:

Thus, such a kit as a kit element comprises at least several varieties of functional rods, namely depending on the desired measuring length, while these functional rods do not necessarily have to differ from each other in their shape and dimensioning at the head end. Then they can always be inserted into the same sort of head housing.

Preferably, however, the kit comprises as further kit elements several varieties of head housings which can differ in different ways, for example
  with regard to the size of their free inner cross section, depending on how extensive the evaluation electronics to be accommodated therein must be,
  with regard to the guide elements for the functional rod, in particular the outer dimensions of the functional rod at its head end which can be handled by guide elements, depending on the measuring principle, possibly also measuring length, type of detector element, possibly type of signal output element, different outer diameters of the functional rod can result which can no longer be handled even by elastic guide elements of a single size of the head housing,
  with regard to the type of line-based external connection.

For in addition to leading out litz wires for external connection, such a head housing can also have a central cable outlet in its bottom and/or a plug part arranged in its bottom, into which a plug can be inserted from the outside.

Furthermore, the kit can have as kit elements at least one type, preferably several types, of signal-related internal line-based connections, i.e., for example, internal wire sets or an internal flexible strip conductors, depending on the measuring principle used or the distance of the head end of the functional rod from the board in its mounted position.

Likewise, as further modular elements, several types of signal-technical line-based external connections can be present, be one or more freely extending cables or wires, one or more freely extending flexible strip conductors, or cables, at the free end of which a—in particular common—plug is present.

Instead of the wired connections, non-contacting connections, such as via radio, infrared or Bluetooth, are of course also possible.

With regard to the method for producing such a position sensor functional unit, the procedure according to the invention is such that first the two main components, i.e. the functional rod and the evaluation electronics, are created, whereby as a rule the internal signal-technical connection between them belongs to at least one of the two main components. If not, these form a further main component, just as the external signal connection is usually part of the evaluation unit, but can also be a separate e.g. litz set.

Subsequently, a signal connection is established between the evaluation electronics and the functional rod, in particular its detector element and/or signal output element, for example via an internal signal connection in the form of internal wires.

If the evaluation electronics are arranged on a electronics board and this has an opening for the functional rod to pass through, and if it is to be passed through, the electronics board must usually be threaded on from the end of the functional rod facing away from the head, which is usually the thinner end, before this signal connection is made, for example by soldering cables to the evaluation electronics, either on the evaluation electronics and/or on the functional rod.

These two main components, which are not permanently but loosely connected to each other—because the passage in the electronics board is usually considerably larger than the outer circumference of the functional rod—are now pre-exposed to the head housing, one after the other or overlapping in time or even simultaneously.

For this purpose, the end of the functional rod on the head side is pushed between the guide elements in the head housing until it comes to an axial stop against the axial stop element.

After this or at the same time, the evaluation electronics are prefixed in the head housing, for example by placing the electronics board against the corresponding axial stop and also against circumferential stops of the head housing, so that it is positioned and, if necessary, fixed axially and radially and in the direction of rotation about the axial direction relative to the head housing, namely when one of these stops is designed as a latching stop.

Furthermore, in the case of contacting external connections, the corresponding wires or the flexible strip conductors must still be led out of the open side of the head housing before the head housing is arranged in an upright position, i.e. with the open side pointing upwards. The head housing is then arranged in an upright position, i.e. with the open side facing upwards, and liquid or paste-like potting compound is poured from the open side into the interior of the head housing, where it can flow past or through the circuit board to the bottom of the head housing and fill the entire interior up to the desired filling level and encase all the components located therein.

The potting is finished as soon as all electrical functional parts such as evaluation electronics, detector element, cable connections, and, if applicable, signal pick-up element are enclosed by the potting compound, i.e. covered by it, except for the cables to be led out of the head housing.

Then, in this upright position of the head housing, the hardening of the potting compound is waited for, after which the functional unit is then fully functional and can also be tested before shipping to customers.

C) EXEMPLARY EMBODIMENTS

Figure 1E:
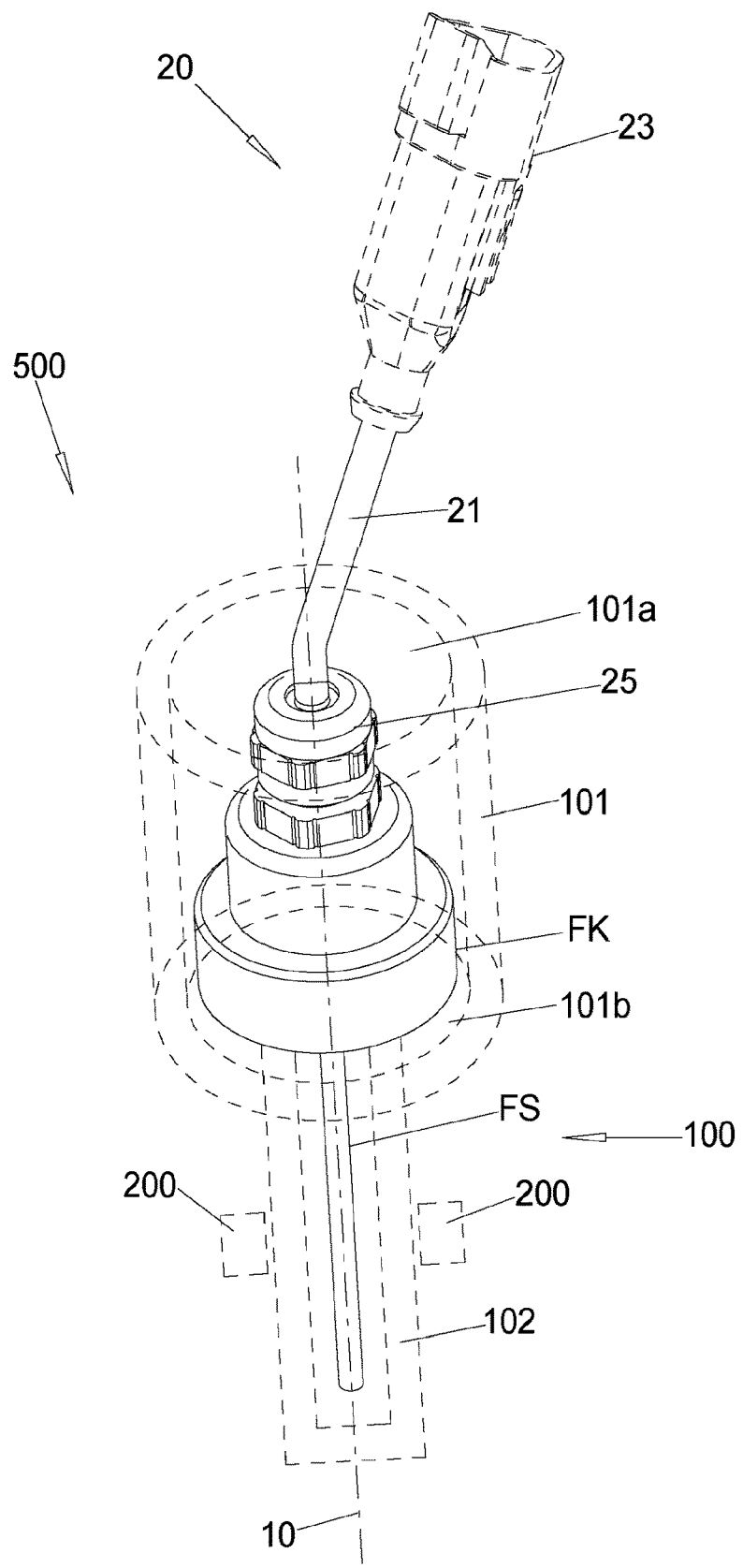
Figure 2B:
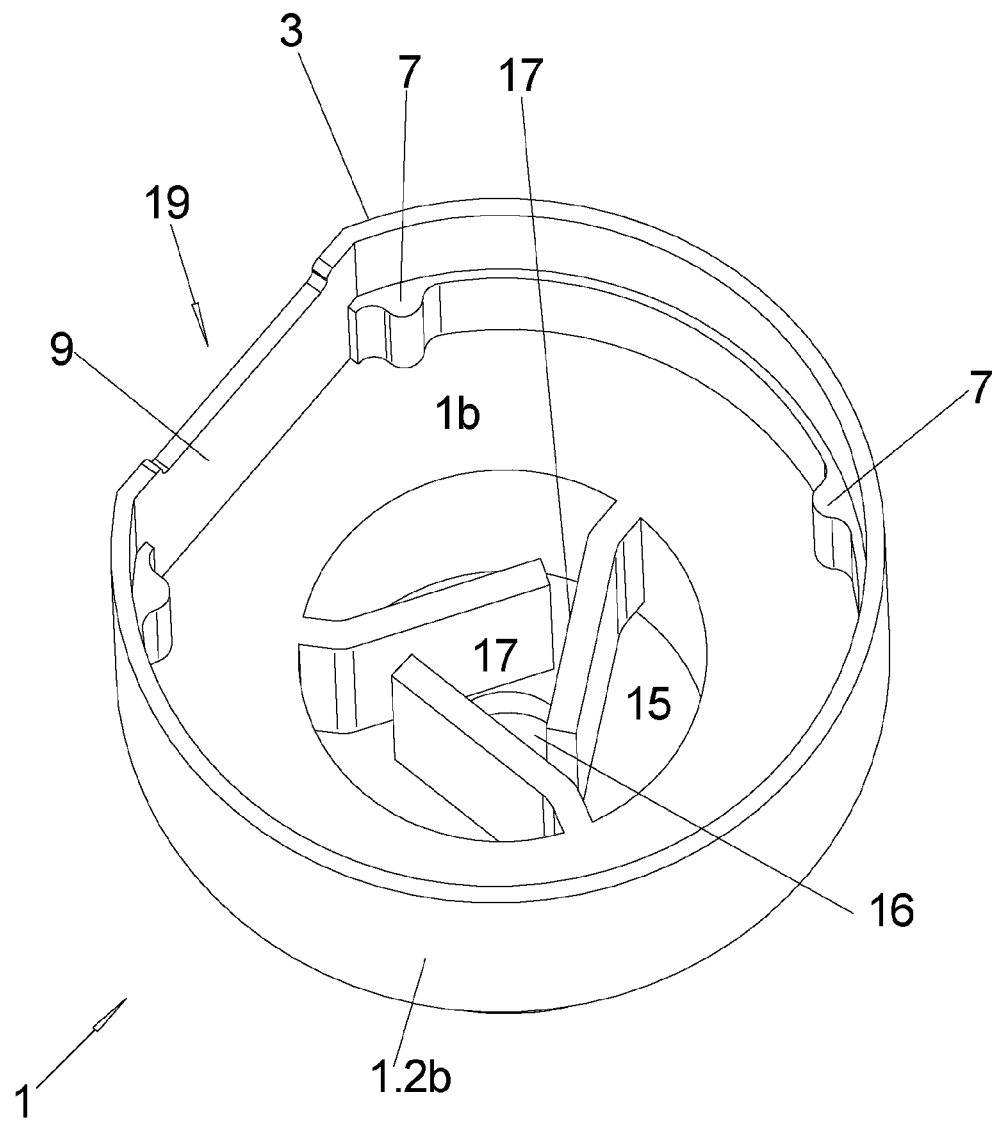
Figure 2C:
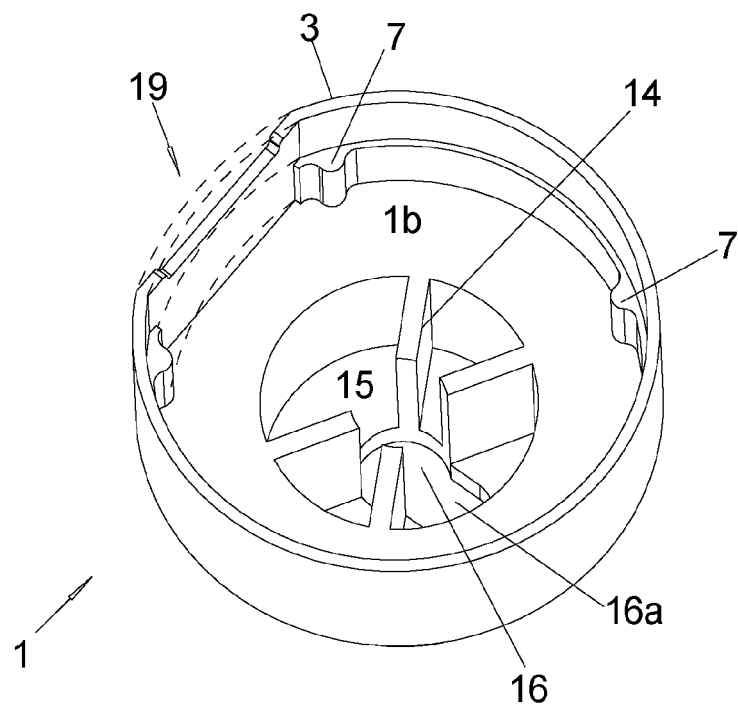
Figure 2D:
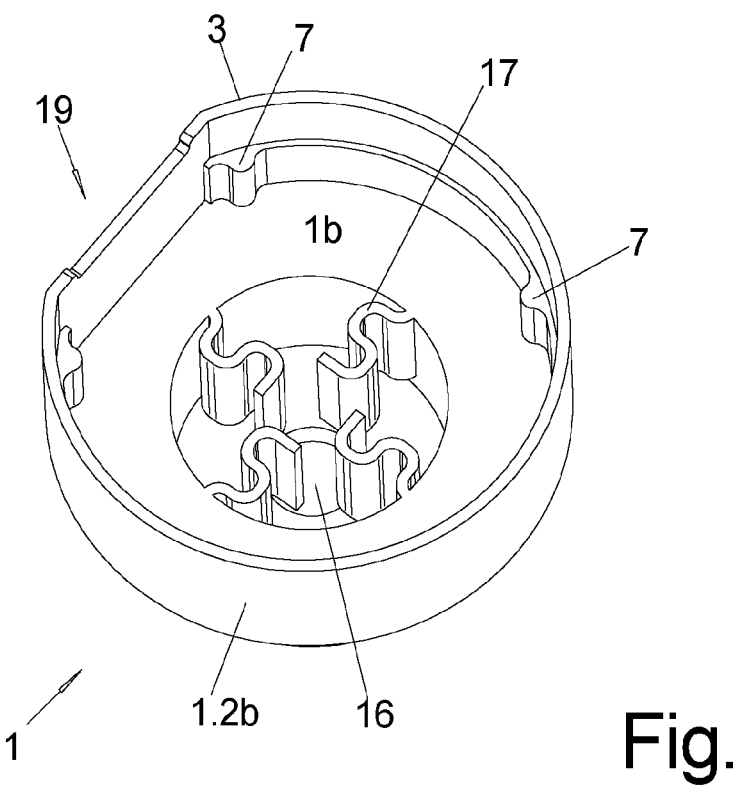
Figure 3E:
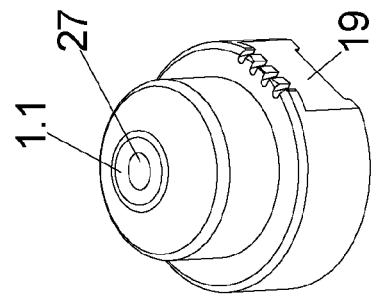
Figure 3D:
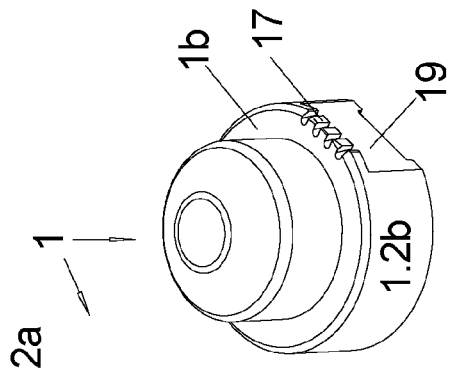
Figure 3C:
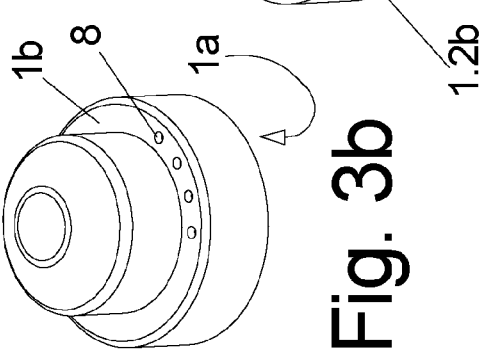
Figure 3B:
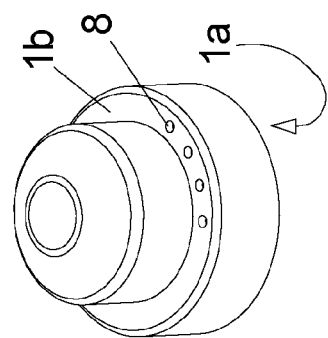
Figure 3A:
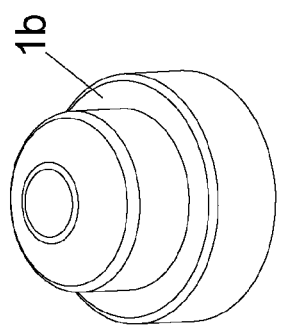
Figure 4A:
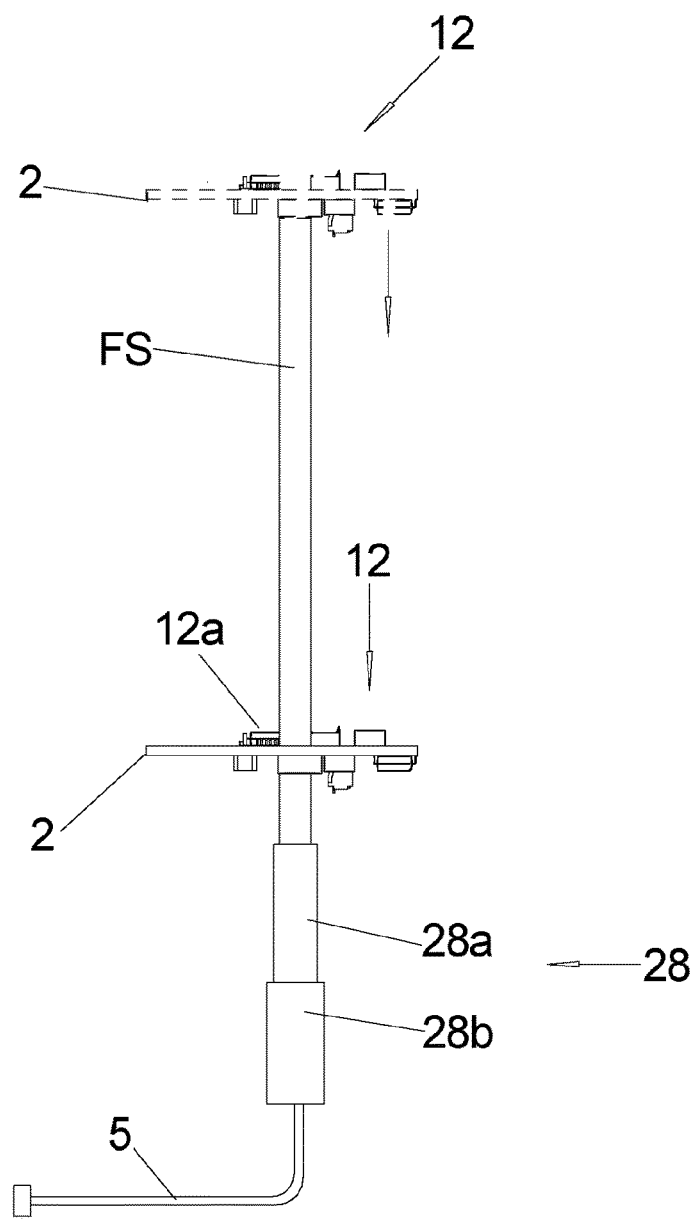
Figure 4B:
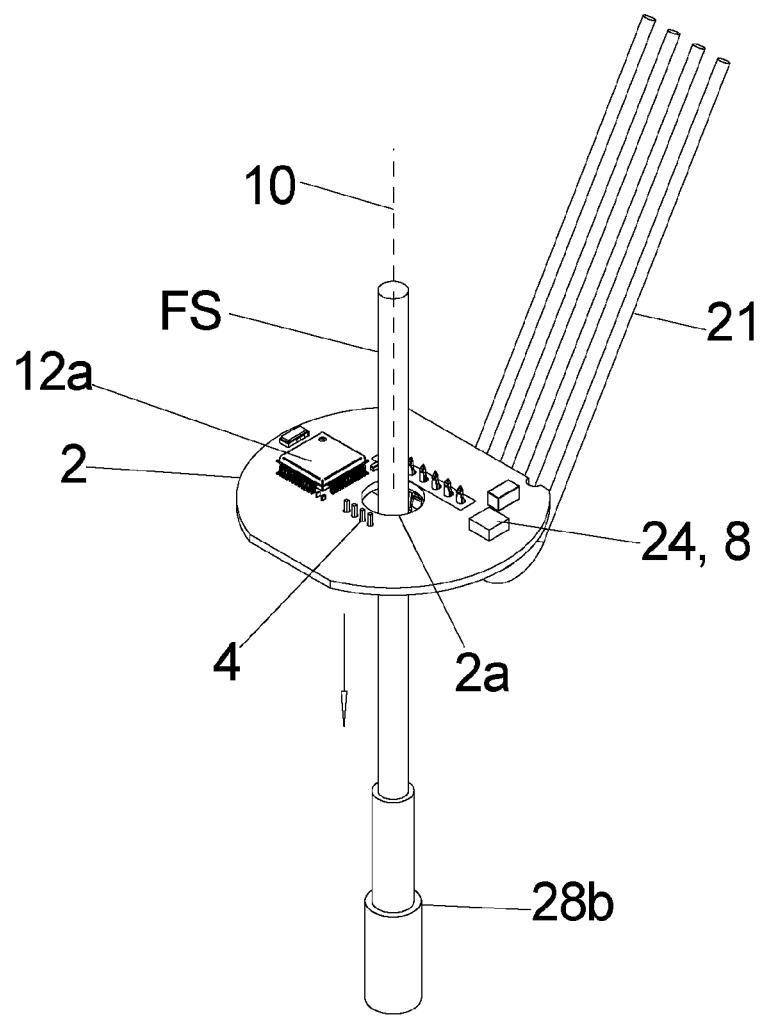
Figure 4C:
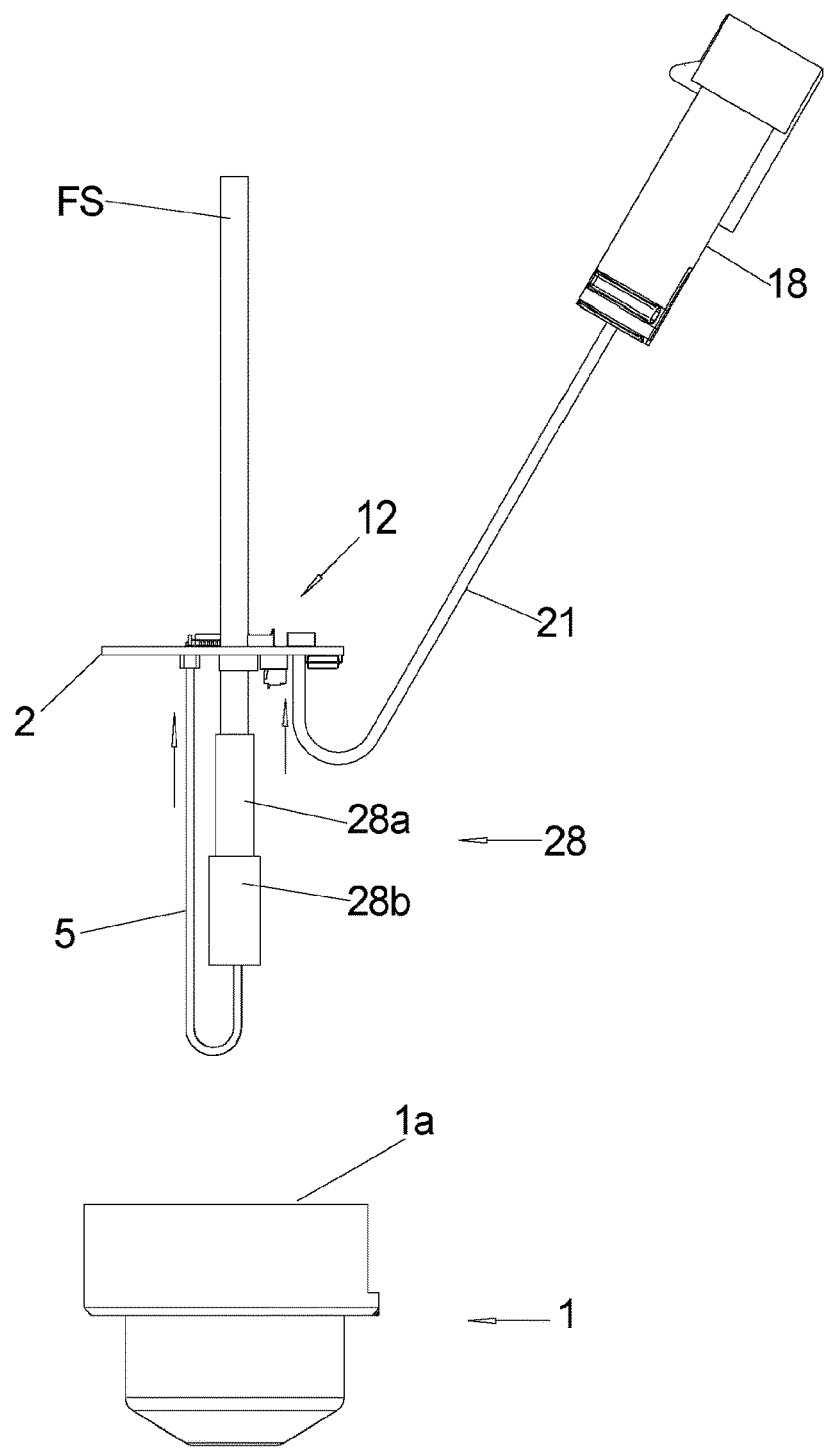

Embodiments according to the invention are described in more detail below by way of example. They show:

FIGS. 1a-e: different versions of the finished position sensor functional unit, each in perspective view, FIGS. 2a1, 2a2: the pot-shaped head housing for the functional head in a side view and an axial section, FIGS. 2b-d: the head housing in different variants in perspective view, viewed from the open side, FIGS. 3a-e: different variants of the head housing in perspective view, viewed from the top of the cup-shaped head housing, FIGS. 4a-c: the step-by-step assembly of the functional parts of the functional head, FIGS. 5a-d: the installation of the functional parts in the head housing and subsequent casting.

Figure 6A:
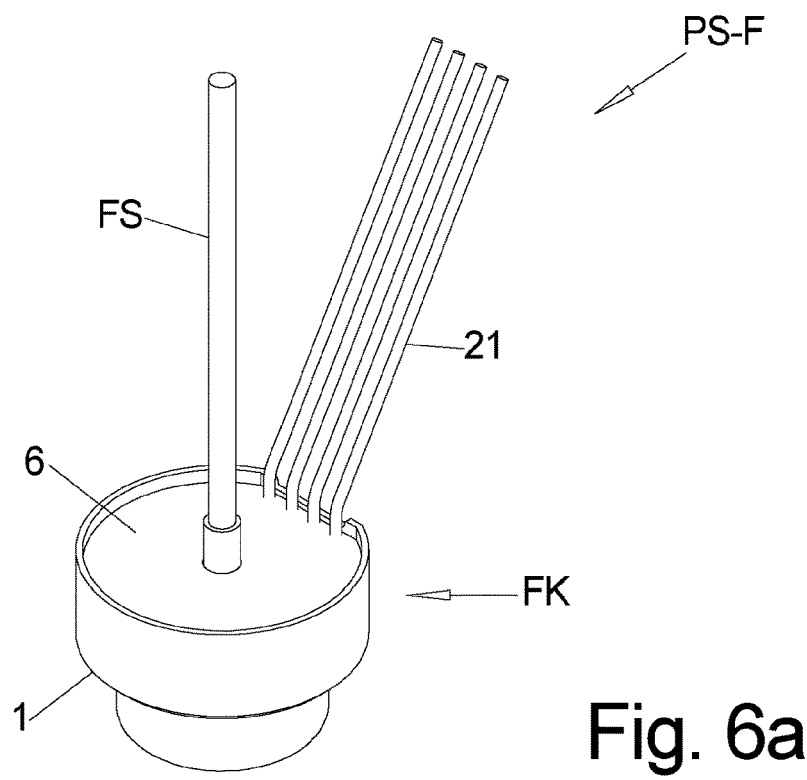

FIGS. 6a,b: the finished, molded position sensor functional unit in two variants.

FIGS. 1a-e show a perspective view of finished position sensor functional units PS-F, each with a pot-shaped functional head FK arranged at the top in the illustration, which in this arrangement and view of the PS-F is cap-shaped with a narrower upper section compared to a wider lower section, and wherein a rod-shaped functional rod FS projects from the wider lower section, which is open downwards here, in this case downwards, in particular centrally with respect to the wide lower part of the functional head FK.

The functional rod FS defines the axial direction 10 of the entire PS-F with its direction of largest extension, the rod direction.

Depending on the measuring length of the position sensor 500, whose position sensor functional unit PS-F is shown here and which is also functional in this state, the functional rod FS is generally several times, often more than 20 times, as long in the axial direction as the functional head FK. In the state shown, the PS-F is functional as soon as a corresponding encoder element 200—as shown in FIG. 1e—enters the effective range of the functional rod FS.

For reasons of mechanical protection or protection against aggressive environmental media, such a PS-F is often additionally installed in a surrounding protective housing 100, as indicated in FIG. 1e.

Such a protective housing 100 can have a pot-shaped rod protective housing 102, which is relatively long when measured in the direction perpendicular to the open side, and into which the functional rod FS of the PS-F is inserted. The rod protective housing 102 can be tightly attached, usually welded, to a passage in the bottom 101b of a usually substantially shorter pot-shaped head protective housing 101, in which the functional head FK is completely accommodated and whose open side 101a can be tightly closed by a cover—not shown.

In the case of an external cable 21 as the external signal connection 20 of the PS-F, this cable 21 or also several wires 21 naturally also lead out of the head protective housing 101 and are usually connected to a control by means of signal technology, for example via the plug 23 shown in FIG. 1e at the free end of the external cable 21.

If the position sensor 500 comprises such a protective housing 100 in addition to the PS-F, the encoder element 200 is generally arranged radially outside the rod protective housing 100, either on one side or surrounding it annularly. The encoder element 200 is fixed to the component whose position in the longitudinal direction 10 is to be measured with respect to the position sensor 500, which is generally mounted in a fixed position.

FIGS. 1*a-e* show different types of external signal connections of the PS-F and different designs of its functional head FK:

FIG. 1*a* shows an embodiment in which no cables at all protrude from the PS-F, since the external signal connection 20 is contactless, e.g. via a radio module inside the PS-F, in particular inside the functional head FK.

If, on the other hand, the external signal connection 20 is made via external wires 21, i.e. wires 21 leading out of the functional head FK, these wires 21 may, for example protrude from a diameter shoulder of the functional head FK and project in the direction opposite to the functional rod FS, as shown in FIG. 1*c*, or protrude from the broad underside of the hat-shaped functional head FK facing the functional rod FS in the direction of the functional rod FS, thereby protruding approximately parallel thereto according to FIG. 1*b* or also be bent outside the functional head in the opposite direction, and in this case be held on the outside of the functional head FK via clamping elements 17, or in the end side of the functional head FK facing away from the functional rod FS, a plug-socket 22 is arranged, to which a plug can be connected, as shown in FIG. 1*d*, or at the end side of the functional head FK facing away from the functional rod FS, a cable 21 is led out centrally through a sealing cable screw joint 25, which is arranged on the functional head FK, and through which the cable 21 extends out according to feature 1*e*, wherein a plug 23 or a plug-socket can in turn be located at the free end of the external cable 21.

In such a functional head FK, the functional components, i.e. the electrically and/or magnetically and/or mechanically active components, are housed inside a cap-shaped or pot-shaped head housing 1—depending on the spatial position—which is shown separately in FIGS. 2*a* to 3*e*:

The head housing 1 is—at least as far as the bottom 1.1 and the circumferential wall 1.2 are concerned—essentially rotationally symmetrical, as can be seen in the side view of FIG. 2*a*1 and analogous sectional view of FIG. 2*a*2 and the perspective views of FIGS. 2*b* to *d*.

Nevertheless, a flattening 19 may be present in the otherwise circular peripheral wall 1.2 on one side of the circumference or, if necessary, on several sides, as can also be seen clearly in FIG. 1*a*, *b* and FIG. 2*a*1, 2*a*2.

Regardless of this, the shape of the head housing 1 viewed in the axial direction 10 is irrelevant for the realization of the invention, but the manufacture of rotationally symmetrical, straight pot-shaped, parts, for example also for the possibly surrounding protective housing 100, is often simpler and less expensive than other basic shapes.

However, the head housing 1 is not a housing which alone must provide a sufficient, e.g. mechanical, protective function for the functional parts of the PS-F accommodated therein, but merely serves as a mold to be filled for the subsequent potting of the functional parts therein, and is therefore usually manufactured inexpensively as an injection-molded part made of plastic, in which case the basic shape has hardly any influence on the manufacturing costs.

According to FIG. 2*a*, the bottom 1.1, which like the open side 1*a* is preferably perpendicular to the axial direction 10, the axis of symmetry for the rotationally symmetrical parts of the head housing 1, merges into the peripheral wall 1.2 with an oblique, i.e. frustoconical, section in between. In addition, the peripheral wall 1.2 has a radial shoulder 1*b* approximately in the middle of its axial extension, so that the first axial section 1.2*a* of the peripheral wall 1.2, which starts at the bottom 1.1, has a smaller diameter, as a rule both inner diameter and outer diameter, than the second axial section 1.2*b* of the peripheral wall 1.2, which adjoins it and extends in particular to the open side 1*a*.

FIGS. 3*a-e* show the cap-shaped head housing 1 in this orientation in perspective view from the bottom 1.1.

In the design of FIG. 3*a*, the outer contour of the head housing 1 is completely rotationally symmetrical and closed throughout except for the open side 1*a*.

In the design according to FIG. 3*b*, there are several small through-holes 8 in the shoulder 1*b*, through each of which a wire or stranded wire, which will of course be circumferentially insulated, can be led out, as shown in FIG. 1*c*. The outer circumference of the sensor housing 1 is generally completely rotationally symmetrical.

In contrast, the embodiments according to FIG. 3*c* and FIG. 3*d* show a flattening 19 at the second section 1.2*b* of the peripheral wall with a flat surface running parallel to a tangent of the second section 1.2*b*, which is rotationally symmetrical in the case.

This flattening serves to create a radial free space up to the flying circle of the second section 1.2*b* in order to feed external cables 21 in between, as shown in FIG. 1*b*. Thereby, according to FIG. 3*d*, at the transition between the shoulder 1*b* and the second section 1.2*b*, clamping elements 17 can be provided, preferably in one piece, on the head housing 1, in which the individual wires 21 running along there can be pressed in and thereby clamped.

FIG. 3*e* further shows a head housing 1, in which—preferably centrally—in the bottom 1.1, a central opening 27 is located, which serves to lead out an external cable 21 and/or to fasten a cable screw joint and/or a plug-socket 22.

The different embodiments inside the head housing 1, as can be seen in the perspective views of FIGS. 2*b* to 2*d*, will be explained with reference to the assembly procedure as illustrated with reference to FIGS. 4*a-d*:

First, the functional parts of the PS-F are pre-assembled—i.e., in particular before they are inserted into the head housing 1:

The evaluation electronics 12 with a processor 12*a* for the PS-F, as well as possibly further electronic components, are arranged on an electronics board 2, as shown in FIG. 4*b*. In the case of a contactless external signal connection 20, further elements on the board 2 may include, for example, a radio module 24, in particular with a transmitting and receiving element 8, and possibly also a buffer battery, which is not shown.

The fully assembled board 2 can comprise, in particular on its underside, connection elements, in particular soldering points or a soldering trough, for connection to the functional rod FS on the one hand and, if necessary, external wires 21 extending from the board 2 on the other hand.

Often the electronics board 2—the outer circumference of which generally corresponds at least in part approximately to the inner circumference of the second, larger section 1.2*b* of the peripheral wall of the head housing 1—has a passage 2*a* centrally through which the functional rod FS can extend.

The detector element 4, in particular for picking up the mechanical-elastic density wave arriving at the detector end at the waveguide not shown, is usually arranged in the detector-side end, i.e. adjacent to the board 2 in the assembled state, of the functional rod FS, which for this purpose can have at its detector end an end sleeve 28 having a larger internal diameter than the rest of the FS, in which the detector element 4 can be arranged, and from which internal wires 5 lead away.

As FIG. 4a shows, during assembly the electronics board 2, which has been fully assembled but is usually not yet connected to the functional parts which will later interact with it, is first threaded onto the functional rod FS with its passage 2a facing away from the detector end, which is usually the narrower end, and is pushed into the vicinity of the end sleeve 28, the end sleeve 28 being formed in two stages with a first section 28a and a second section 28b, which has the larger diameter than 28a, and the second section 28b also having the larger inner diameter than the first section 28a. Section 28b also has the larger inner diameter and is arranged at the detector end.

Figure 5A:
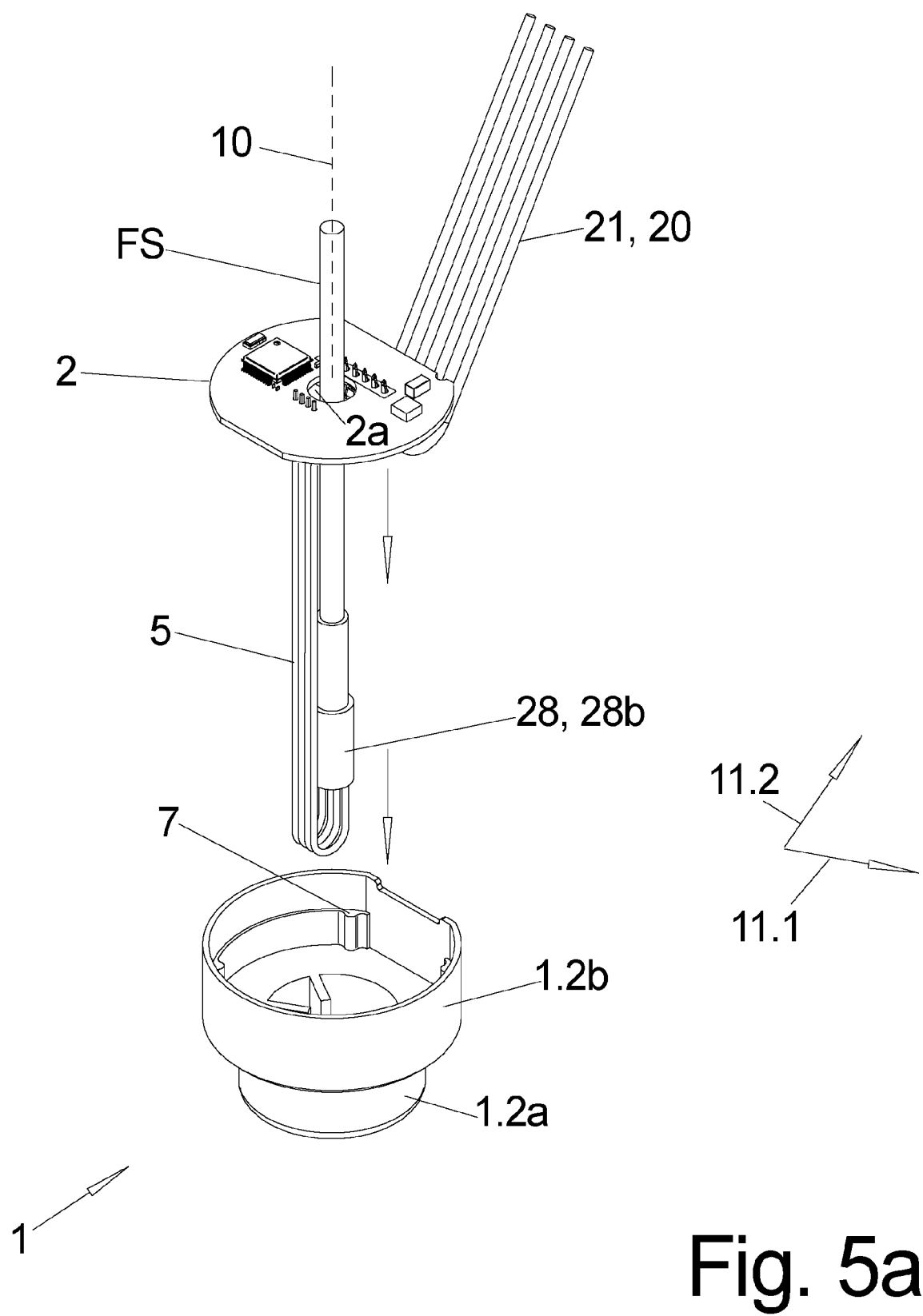
Figure 5B:
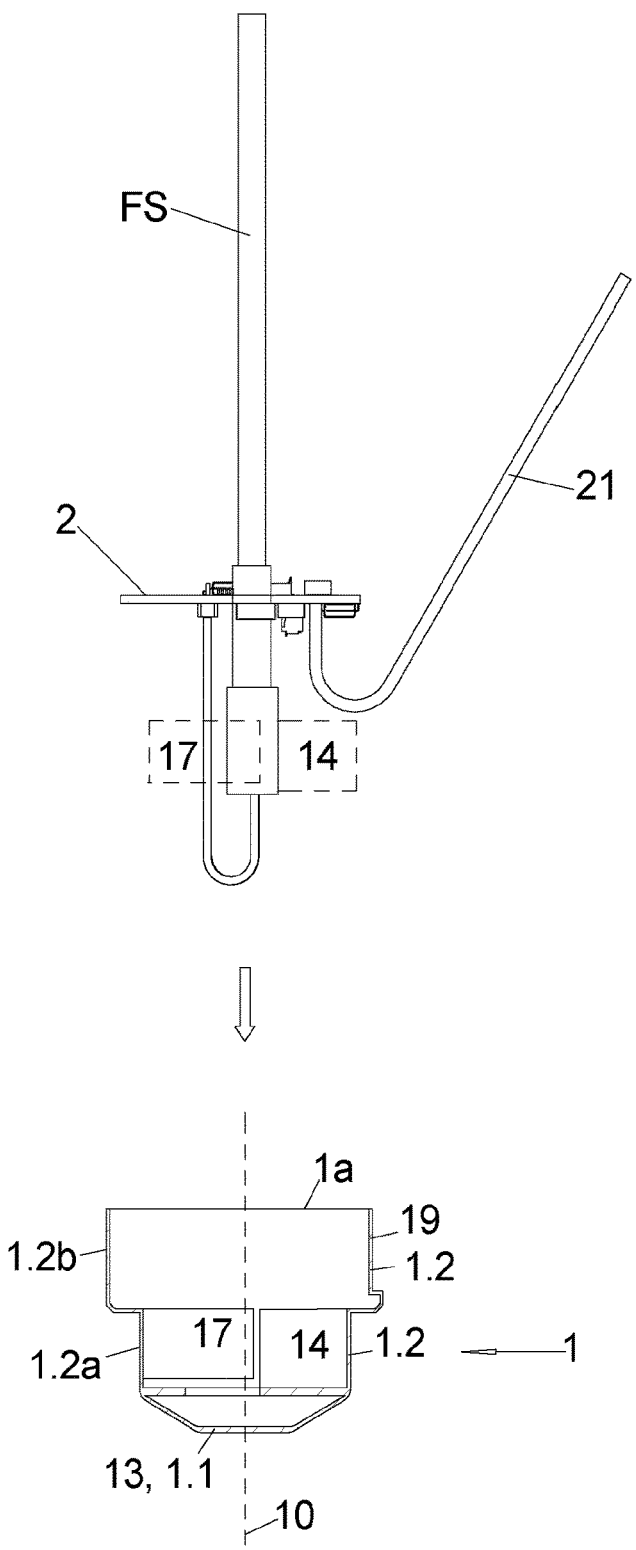
Figure 5C:
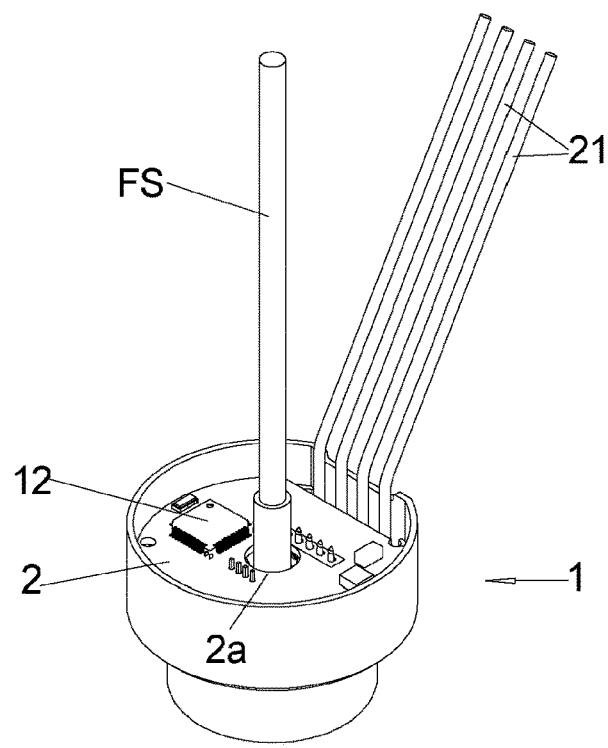
Figure 5D:
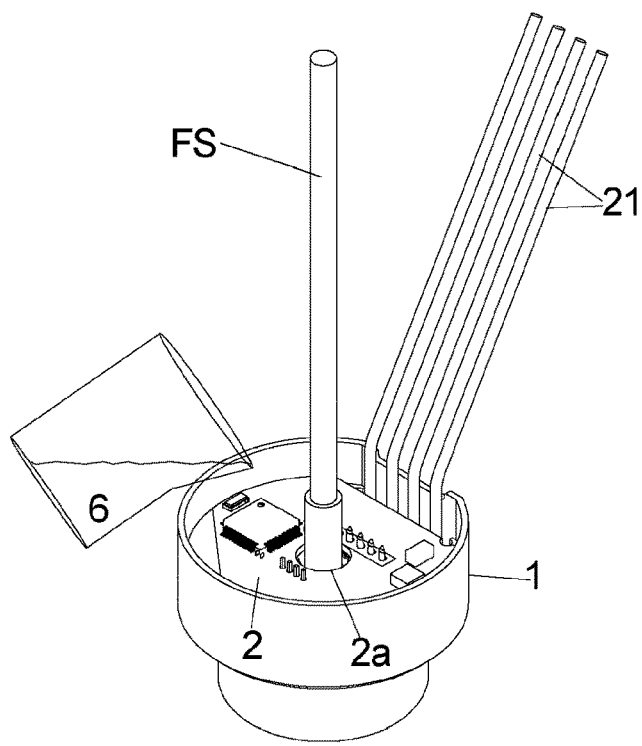

Preferably, the blank 2 is then axially displaced until it is located in the longitudinal region preferably of the end sleeve 28, in particular of the first section 28a with a smaller outer diameter, whereby, however, the passage 2a—as can be seen well in FIG. 5c—is still larger than the outer circumference in this longitudinal region of the functional rod FS, in this case of the first section 28a of the end sleeve 28, so that there is sufficient clearance between them so that they do not touch each other when mounted in the head housing 1.

Usually only after the loose sliding-on according to FIG. 4a, the internal wires 5, which protrude from the detector end of the functional rod FS, are first electrically conductively connected to the electronics board 2 and the electronics components there according to the arrows in FIG. 4c, and likewise external wires 21 for forwarding the measurement result to the outside, if such are present.

As FIG. 4b shows during the threading process, external wires 21 can also be connected to the electronics board 2 before threading.

This finished functional assembly consisting of the electronics board 2, the functional rod FS connected to it by signal technology, and the external wires 21 leading from the board 2 is now mounted in the head housing 1, which is merely a pre-fixing for the subsequent encapsulation:

As shown in FIGS. 5a, b, the functional rod FS with the end sleeve 28, in particular its second section 28b, is inserted between plate-shaped or tongue-shaped guide elements 14 or clamping elements 17, which are inserted from the first section 1.2a of the peripheral wall, i.e. the bottom section, of the head housing 1 and with their radially inner end guide the functional rod FS, in particular its end sleeve 28, or are even intended to clamp it between them by means of a radially inwardly directed contact pressure force, such as can easily be applied in particular in the case of tangentially running tongues as clamping elements 17, as can be seen in FIGS. 2a, b and d.

Below, i.e. in the direction of the bottom 1.1, the guide elements 14 or clamping elements 17 and, in the case of clamping elements 17, usually not connected to them, there can be an intermediate bottom 15 running transversely, i.e. perpendicular to the axial direction 10, between the damping elements and the bottom 1.1, which has a passage for the passage of the detector-side end of the functional rod FS, as this is to extend further in the direction of the bottom up to an axial stop 13 near the bottom 1.1 or formed by the inner side of the bottom 1.1 for the functional rod FS.

The passage 16 has an extension 16a, preferably directed in a radial direction only, which serves to allow the internal wires 5 emerging from the detector-side end of the functional rod FS to be led back next to the functional rod FS in the axial direction 10 through the intermediate bottom 15.

The electronics board can be placed directly on the inner shoulder 1b of the head housing 1, as shown in FIG. 5c, but preferably on an axial stop 7 at a distance above it, in order to be able to attach components and plugs as well as solder pads on both sides of the electronics board 2. For this purpose, several or one annular or ring-segment-shaped circumferential axial stop 7 project from the shoulder, for example running along the inner circumference of the section 1.2b of the peripheral wall 1.2, on which the electronics board 2 can be placed and, if necessary, also screwed into one of the axial stops 7.

The circumferential stop 9 for the electronics board 2 can be either a form-fit connection, such as a corresponding flattening of the peripheral wall at the level of the deposited printed circuit board, in particular its second section 1.2b, as is the case in FIGS. 2b and 2d. In the case of a circular head housing 1 in the height region of the blank, a circumferential stop 9 can also be effected by, for example, a circumferential stop projecting inwards from the peripheral wall and engaging in a recess present at a point on the periphery of the blank 2.

Although FIG. 2a, right-hand side, and FIG. 2c show guide elements 14 which are integral with or at least firmly connected to the intermediate bottom 15 and whose radially inwardly pointing free end edge is preferably aligned with the passage 16 and which represent a large axial guide length, this is the less preferred embodiment, since it largely prevents a spring effect with respect to the functional rod, in particular its end sleeve, as in the case of the clamping elements 17.

This spring effect is in any case achieved less by tongues 17 directed exactly radially towards the central passage 16 as in FIG. 2d, but better by functional rods FS pushed tangentially to the passage 16 and thus through it, as shown by three pieces distributed over the circumference in FIG. 2b. In the case of tongues extending exactly radially, a radial contact pressure can be achieved by these tongues extending radially towards the passage 16 in an undulating manner as shown in FIG. 2d when viewed from above.

However, the clamping elements 17 are generally not connected to the intermediate bore 15 or formed integrally therewith, as can be seen in particular in the left half of FIG. 2a.

In this way, during insertion, as shown in FIG. 5a, b, on the one hand the functional rod FS can be fixed radially between the guide elements 14 or clamping elements 17 of the head housing 1 and also axially by means of an axial stop 13 near the bottom 1.1 and, at the same time or offset in time, the blank 2 can be placed on the axial stop 7 in section 1.2b with the larger internal diameter, which is also fixed there against rotation by means of a stop acting in the circumferential direction.

Both components are thus—when the head housing 1 points upwards with its open side 1a—pre-fixed by gravity in the head housing 1 in a sufficiently precise manner in which the functional rod FS stands with its axial direction 10 perpendicular to the transverse plane defined by the open side 1a and/or the shoulder 1b, spanned by the two transverse directions 11.1 and 11.2, which is why the axial direction 10 for the functional rod FS and the head housing 1 can generally be equated, since they are identical.

In the pre-fixed state of the functional parts in the head housing 1, i.e. the functional rod FS and the electronics board 2, with the open side 1a of the head housing 1 facing upwards, the entire interior of the head housing 1 can be filled up to beyond the upper side of the electronics board 2 and to the extent that all the components mounted thereon are still cast in, with potting compound 6, so that after the curing of the potting compound 6 the functional parts are protected both mechanically and against environmental influences, except for the parts which protrude from the cured potting compound, i.e. in particular the main part of the functional rod FS as well as any external signal lines 21.

FIG. 6*a* shows the finished encapsulated and thus finished position sensor functional unit PS-F with flattened head housing and external leads 21 protruding from the encapsulation compound.

Figure 6B:
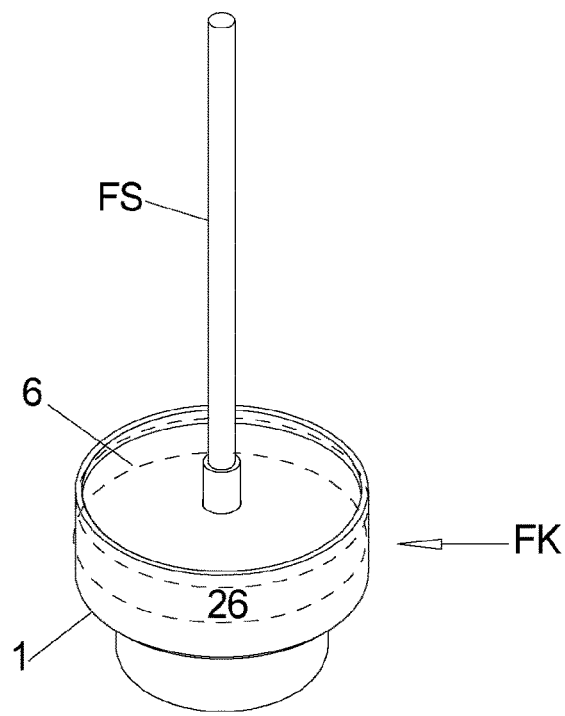

FIG. 6*b* shows an embodiment without external wires leading out of the functional head FK and with a head housing 1 that is completely rotationally symmetrical with respect to its outer circumference, i.e. without flattening.

FIG. 6*b* shows the inductive element 26, which is arranged inside the head housing 1, preferably close to the outer circumference and is usually ring-shaped, and via which a wireless supply of electrical energy from outside is possible.

REFERENCE LIST 1 pot-shaped head housing
1.1 bottom
1.2 peripheral wall
1*a* open side
1*b* shoulder
1.2*a* first axial section
1.2*b* second axial section
2 electronics board
2*a* passage
3 sensor rod
4 detector element
5 internal wire, internal litz wire, flexible strip conductor
6 potting compound, potting mass
7 axial stop
8 signal output element, transmitter-receiver
9 circumferential stop
10 axial direction, rod direction
10* indirect direction
11.1, 11.2 transverse direction
12 evaluation electronics
12*a* processor
13 stop
14 guide element
15 intermediate bottom
16 opening
16*a* extension
17 clamping element
18 inductive power supply
18*a, b* inductive element
19 flattening
20 external signal connection
21 external wire, external litz wire, external cable
22 plug-socket
23 plug
24 radio module
25 cable outlet, tight cable screw joint
26 inductive element
27 Central opening
28 end sleeve
28*a, b* first, second section
100 protective housing
101 pot-shaped head protective housing
101*a* open side
101*b* passage
102 pot-shaped rod protective housing
102*a* open side
200 encoder element, encoder magnet. Position element
500 position sensor
PS-F position sensor functional unit
FK functional head
FS functional rod

The invention claimed is:

1. A position sensor functional unit (PS-F) of a position sensor (500) according to a non-contact functional principle in closed rod design comprising:
  a functional head (FK) having
    a pot-shaped head housing (1),
    an evaluation electronics (12), in particular on an electronics board (2), in the head housing (1),
  a functional rod (FS) having
    a sensor rod (3) terminating in the head housing (1)
    a detector element (4) at the head end of the functional rod (FS),
    a signal-technical internal connection between detector element (4) and evaluation electronics (12) and, if necessary, a signal output element (8),
  characterized in that
    the evaluation electronics (12), at least the detector element (4) of the functional rod (FS), and possibly the signal-technical internal wire connection (5) are potted in the top housing (1) by means of a hardening potting compound (6),
    the open side (1*a*) of the pot-shaped head housing (1) faces the functional rod (FS)
  or
    the functional rod (FS) and the evaluation electronics (12) are mechanically fixed only indirectly to one another via the head housing (1) or the hardened potting compound (6).

2. The position sensor functional unit according to claim 1,
  characterized in that
    the electronics board (2) has a central passage (2*a*),
    the central passage (2*a*) is larger than the outer circumference of the functional rod (FS) at this axial position in the assembled state.

3. The position sensor functional unit according to claim 1,
  characterized in that
    the functional rod (FS) has a larger outer circumference at its head end than in its remaining course.

4. The position sensor functional unit according to claim 1,
  characterized in that
    the head housing (1) comprises axial (7) or circumferential stops (9) acting in the circumferential direction for positioning the evaluation electronics (12).

5. The position sensor functional unit according to claim 1,
  characterized in that
    the head housing (1) has an axial stop (13) for the end of the functional rod (FS)
  or
    the head housing (1) has guide elements (14) guiding the functional rod (FS) in the axial direction (10).

6. The position sensor functional unit according to claim 1,
  characterized in that
    the guide elements (14) center the functional rod (FS)
    the guide elements (14) are elastic in radial direction and can guide different outer circumferences of functional rods (FS).

7. The position sensor functional unit according to claim 5,
characterized in that
an intermediate bottom (15) is arranged between the guide elements (14) and the bottom of the head housing (1),
with an opening (16) for the functional rod (FS).

8. The position sensor functional unit according to claim 7,
characterized in that
the opening (16) is widened in a transverse direction (11.1) for passing internal wires (5).

9. The position sensor functional unit according to claim 1,
characterized in that
the head housing (1) has a substantially rotationally symmetrical inner or outer contour, rotationally symmetrical about an axial direction (10)
or
the head housing is an injection-molded plastic part or an injection-molded metal part,
in the case of a plastic injection-molded part, the head housing is provided with a metallic coating extending over the entire outer surface or inner surface.

10. The position sensor functional unit according to claim 1,
characterized in that
the inner free cross section of the head housing (1) decreases continuously or in steps from the open side (1a) to its bottom (1.1), and
the intermediate bottom (15) is arranged at the level of such a step.

11. The position sensor functional unit according to claim 1,
wherein an external signal connection (20) is provided between the evaluation electronics (12) and an external control system, which requires the measurement signals of the position sensor functional unit (PS-F),
characterized in that
in the case of a contacting external signal connection (20) via at least one wire (21), this line is
is guided through the bottom (1.1) of the head housing (1) in a sealed manner or
are led out of the potting compound (6) and through the open side (1a) of the head housing (1)
can be fixed in clamping elements (17) provided on the outside of the head housing (1).

12. The position sensor functional unit according to claim 1,
characterized in that
in the case of a contactless external signal connection (20), a transmitter or transmitter-receiver (8) is present as a signal-emitting element (8) on the electronics board (2), and is arranged completely within the potting mass (6).

13. The position sensor functional unit according to claim 1,
characterized in that
in the case of a contactless, inductive, power supply (1), an inductive element (18a), in particular a receiver coil with control unit, is present, close to the wall of the head housing (1) or on the electronics board (2), and is arranged completely within the potting mass (6).

14. The position sensor (500) comprising
a position sensor functional unit (PS-F) according to claim 1, having
a pot-shaped head housing (1)
a protective housing (100) for the position sensor functional unit (PS-F) having
a short pot-shaped head protective housing (101),
a substantially longer pot-shaped rod protective housing (102) tightly fitted to a passage (101a) in the bottom of the pot-shaped head protective housing (101) or integrally formed together with the head protective housing (101),
wherein the position sensor functional unit (PS-F) is insertable into the protective housing (100) in an insertion direction (10*) with the end facing away from the head housing (1),
a position encoder element (200),
characterized in that
the pot-shaped head protective housing (101) of the position sensor functional unit (PS-F) and the rod protective housing (102) of the protective housing (100) point with their open sides (101a, 102a) in the same first direction against the insertion direction (10*), and
the pot-shaped head housing (1) points with its open side (1a) in the opposite direction, in particular in the insertion direction (10*).

15. A kit for manufacturing different position sensor functional units (PS-F) from as few individual parts as possible, comprising:
modular elements;
several sorts of functional rods (FS); and
at least one sort of functional heads (FK).

16. The kit according to claim 15,
characterized in that
the kit comprises as further kit elements
several sorts of functional heads (FK)
or
at least one sort of signaling internal connections (5)
or
at least one sort of external signal connections (20)
or
at least one sort of power supply.

17. A method for manufacturing a position sensor functional unit (PS-F), comprising
the following steps:
a) establishing a signal connection between the evaluation electronics (12) and the functional rod (FS), in particular its detector element (4),
b) inserting the functional rod (FS) with its head end between the elements,
c) arranging the evaluation electronics (12), in particular the board (2) on the at least one axial stop (7) and/or circumferential stop (9),
d) in the case of contacting external connections (20), leading the wires (21) or flexible strip conductor out of an open side (1a) of the head housing (1),
e) upright arrangement of the head housing (1) with the open side (1a) facing upwards,
f) potting the interior of the head housing (1), in particular until only the wires (21) projecting from the open side (1a) protrude upwardly from the potting compound (6), and
g) curing the potting compound (6) in this upright position of the head housing (1).

18. The method for manufacturing a position sensor functional unit according to claim 17, characterized in that
in the case of a through-opening in the circuit board (2) for insertion of the functional rod (FS), the circuit board (2) is placed on the free end of the functional rod (FS) facing away from the head end before the digital connection between the evaluation electronics (12) and the functional rod (FS) is established in step a).

* * * * *